United States Patent
Bitner et al.

(10) Patent No.: US 10,985,395 B2
(45) Date of Patent: Apr. 20, 2021

(54) CELL AND CELL STACK OF A REDOX FLOW BATTERY, AND METHOD FOR PRODUCING SAID CELL STACK

(71) Applicant: VOLTSTORAGE GmbH, Olching (DE)

(72) Inventors: Jakob Bitner, Bayreuth (DE); Felix Kiefl, Munich (DE); Michael Peither, Munich (DE)

(73) Assignee: VoltStorage GmbH, Olching (DE)

(*) Notice: Subject to any disclaimer, the term of this patent is extended or adjusted under 35 U.S.C. 154(b) by 45 days.

(21) Appl. No.: 16/091,223

(22) PCT Filed: Apr. 3, 2017

(86) PCT No.: PCT/DE2017/000088
§ 371 (c)(1),
(2) Date: Oct. 4, 2018

(87) PCT Pub. No.: WO2017/174053
PCT Pub. Date: Oct. 12, 2017

(65) Prior Publication Data
US 2019/0157700 A1 May 23, 2019

(30) Foreign Application Priority Data
Apr. 4, 2016 (DE) ..................... 10 2016 004 027.0

(51) Int. Cl.
*H01M 8/04186* (2016.01)
*H01M 8/04* (2016.01)
(Continued)

(52) U.S. Cl.
CPC ....... *H01M 8/188* (2013.01); *H01M 8/04186* (2013.01); *H01M 8/04201* (2013.01); *Y02E 60/50* (2013.01)

(58) Field of Classification Search
None
See application file for complete search history.

(56) References Cited

U.S. PATENT DOCUMENTS

| | | |
|---|---|---|
| 2004/0170893 A1 | 9/2004 | Nakaishi et al. |
| 2016/0164112 A1* | 6/2016 | Seipp ............... H01M 8/188 |
| | | 429/508 |

FOREIGN PATENT DOCUMENTS

| | | | | |
|---|---|---|---|---|
| AT | 510 250 A1 | 2/2012 | | |
| DE | 102013107516 A1 * | 1/2015 | .......... | H01M 8/0273 |

(Continued)

OTHER PUBLICATIONS

PCT Search Report and Written Opinion issued in PCT/DE2017/000088 and dated Jul. 27, 2017.

*Primary Examiner* — Yoshitoshi Takeuchi
(74) *Attorney, Agent, or Firm* — Parker Highlander PLLC

(57) ABSTRACT

The invention relates to a cell (2) of a redox flow battery, having at least two cell frame elements (7, 8, 9, 10), having a membrane (12) and having two electrodes (11), wherein the at least two cell frame elements, the membrane and the two electrodes close off two mutually separate cell interior spaces (4), wherein, in the at least two cell frame elements, at least four separate ducts (13, 14, 15, 16) are provided in such a way that the two cell interior spaces can be flowed through by different electrolyte solutions, and wherein the cell is, aside from the at least four separate ducts, of liquid-tight form. The invention also relates to a cell stack (1) of a redox flow battery having at least one such cell. Here, the invention proposes a particular form of the cell frame of the cell stack, and an inexpensive and simple method for manufacturing the cell stack. Here, all of the stack components, that is to say the at least two cell frame elements, a membrane and two electrodes, are cast together with one another in a cast housing using a liquid plastic, and (Continued)

Figure 1:
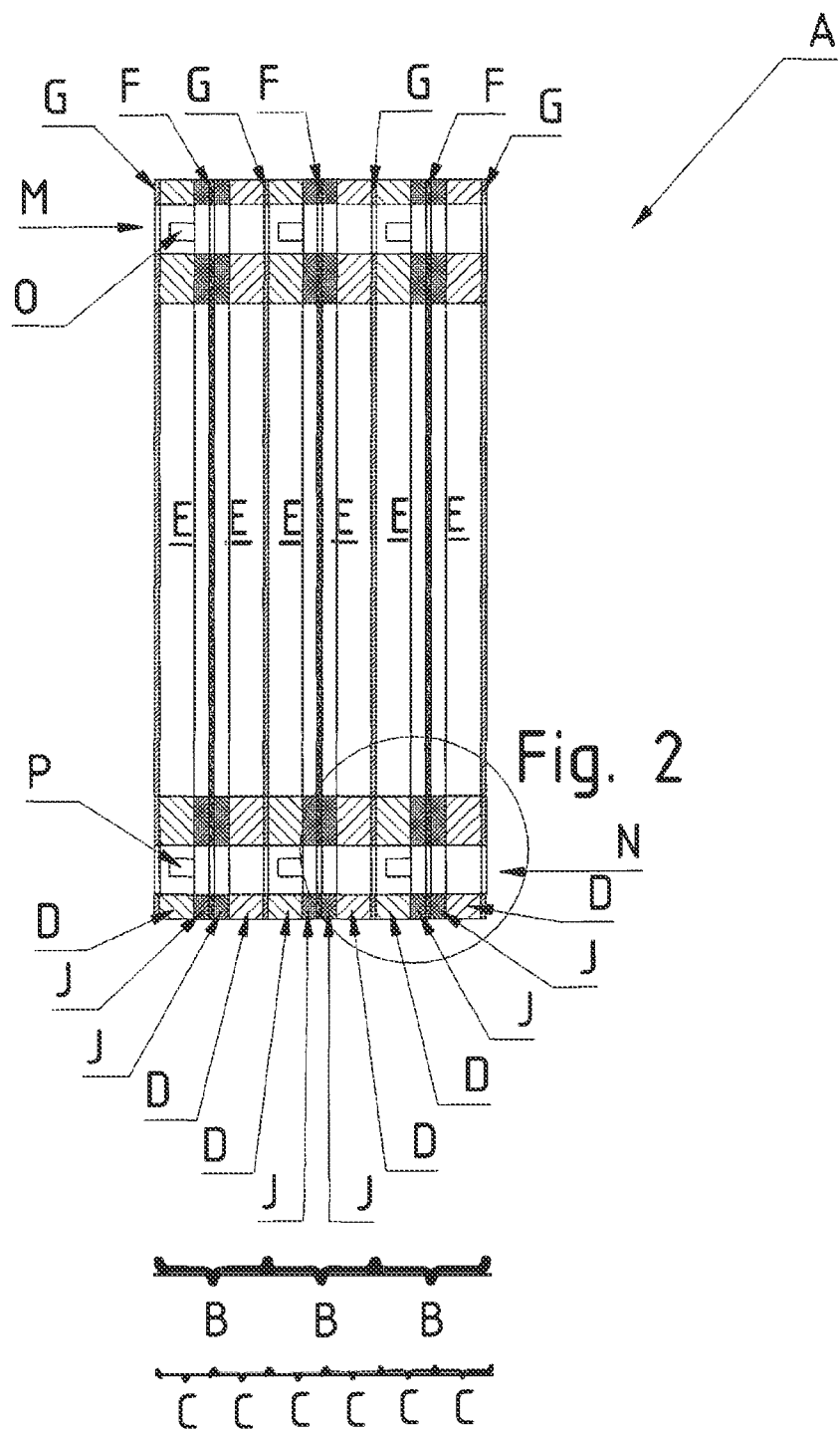

are thus permanently joined in a standardizable working step. In this way, automated series manufacture is possible.

11 Claims, 8 Drawing Sheets

(51) Int. Cl.
*H01M 8/04082* (2016.01)
*H01M 8/18* (2006.01)

(56) References Cited

FOREIGN PATENT DOCUMENTS

| DE | 10 2014 103292 A1 | 9/2015 |
|----|-------------------|--------|
| DE | 2017/000088 A1 | 7/2017 |
| WO | WO 94/09526 A1 | 4/1994 |

\* cited by examiner

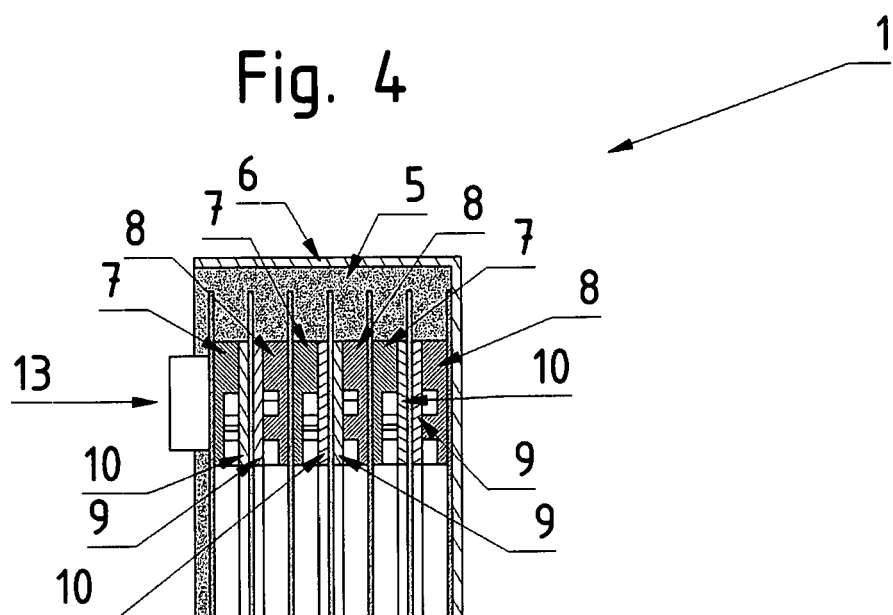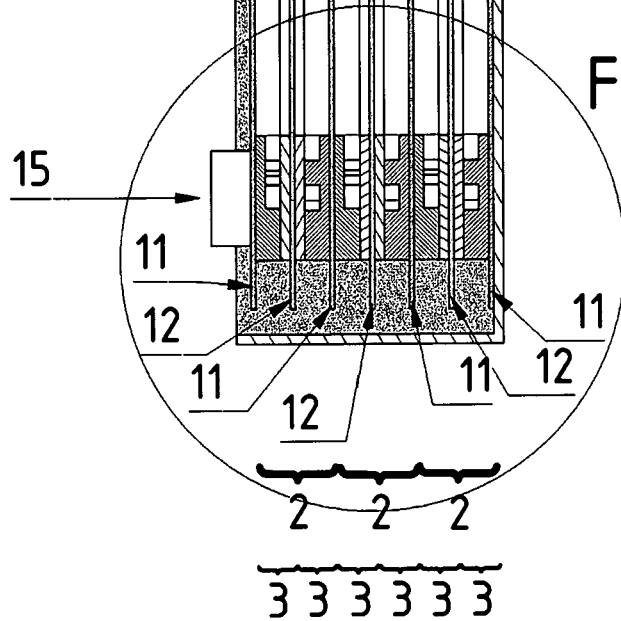

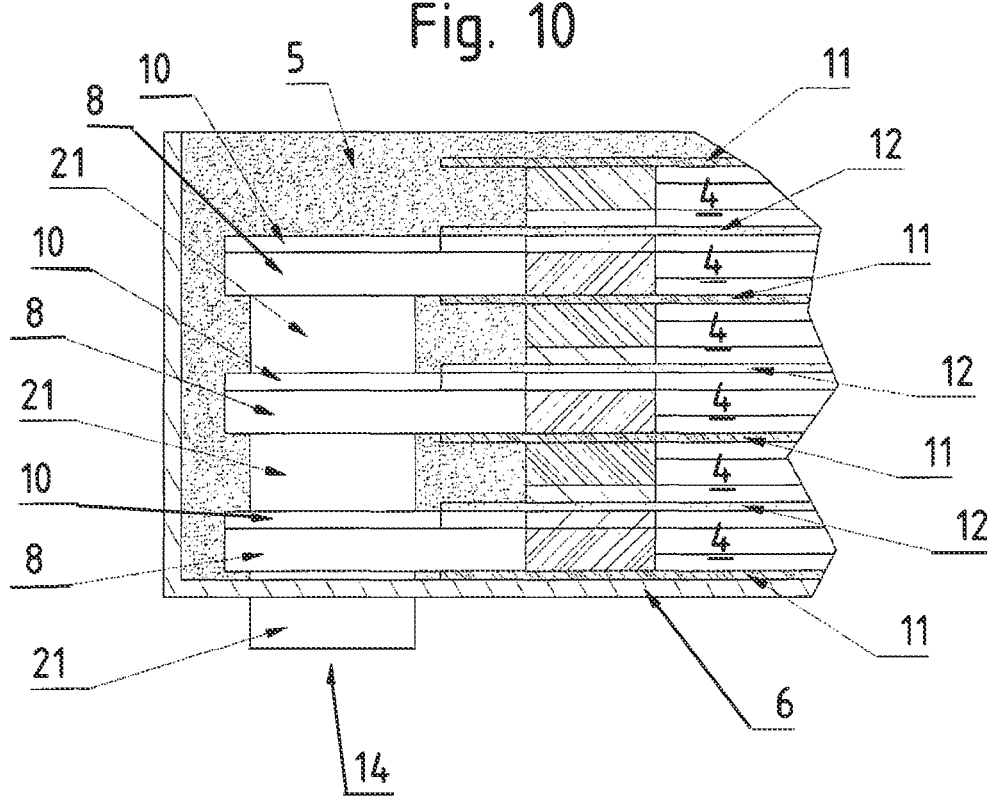

CELL AND CELL STACK OF A REDOX FLOW BATTERY, AND METHOD FOR PRODUCING SAID CELL STACK

This application is a national phase application under 35 U.S.C. § 371 of International Application No. PCT/DE2017/000088 filed on Apr. 3, 2017, which claims benefit of priority to German Patent Application No. 10 2016 004 027.0 filed on Apr. 4, 2016, the entire contents of which are hereby incorporated by reference.

DESCRIPTION

The invention relates to a cell of a redox flow battery, having at least two cell frame elements, a membrane and two electrodes, wherein the at least two cell frame elements, the membrane, and the two electrodes close off two cell interior spaces which are separated from one another, wherein, in the at least two cell frame elements, at least four separate ducts are provided in such a way that it is possible for different electrolyte solutions to flow through the two cell interior spaces, and wherein, aside from the at least four separate supply ducts, the cell is liquid tight. The invention further relates to a cell stack of a redox flow battery comprising at least one such cell.

Redox flow batteries are already known in a variety of designs. Examples of such designs are described in AT 510 250 A1 and US 2004/0170893 A1. One important advantage of redox flow batteries is their suitability for being able to store very large amounts of electrical energy. The energy is stored in electrolytes which can space-efficiently be kept available in very large tanks. The electrolytes usually have metallic ions of different oxidation states. In order to extract electrical energy from the electrolyte or to recharge said electrolytes, the electrolytes are pumped through a so-called electrochemical cell. For the sake of simplicity, instead of the term electrochemical cell, in the following only the term cell is used.

The cell is formed from two half-cells, which are separated from one another by means of a membrane, and each comprises a cell interior space, an electrolyte, and an electrode. The membrane is semi-permeable and has the task of spatially and electrically separating the cathode and the anode of an electrochemical cell from one another. To do this, the membrane has to be permeable to specific ions which bring about the conversion of the stored chemical energy into electrical energy. Membranes can be made of microporous plastics or polyethylene, for example. Redox reactions take place at both electrodes of the cell, i.e. at the anode and at the cathode, wherein electrons are released from the electrolytes at one electrode and electrons are received at the other electrode. The metallic and/or non-metallic ions of the electrolytes form redox pairs and therefore generate a redox potential. Suitable redox pairs are, for example, iron-chromium, polysulphide bromide, vanadium, or other heavy metals. These or other redox pairs can generally be present in aqueous or non-aqueous solution.

The electrodes of a cell, between which a potential difference forms as a result of the redox potentials, are electrically connected to one another outside the cell, e. g. via an electric consumer. While the electrons pass from one half-cell to the other outside the cell, ions of the electrolytes pass through the membrane directly from one half-cell to the other half-cell. In order to recharge the redox flow battery, instead of the electric consumer, a potential difference can be applied to the electrodes of the half-cells, for example using a charging device, by means of which the redox reactions occurring at the electrodes of the half-cells are reversed.

Cell frames which peripherally enclose a cell interior space are used to form the described cell. Each half-cell comprises such a cell frame, which is usually produced from a thermoplastic resin using an injection moulding process. The membrane, which separates the electrolytes of the half-cells from one another in terms of a convective material exchange, but allows diffusion of specific ions from one half-cell into the other half-cell, is arranged between two cell frames. One respective electrode is additionally assigned to the cell interiors in such a way that said electrodes are in contact with the electrolytes flowing through the cell interior spaces. The electrodes can, for example, close off the cell interior space of each cell frame on the side facing away from the membrane. Every cell frame has openings and ducts, through which the corresponding electrolyte can flow from a supply line into the respective cell interior space and again be withdrawn from there and fed to a disposal line. In doing so, the electrolytes of the half-cells are transferred from a storage container into a collection container via the supply line and the disposal line. This allows the reuse of the electrolytes, which therefore do not have to be discarded or replaced.

If necessary, a number of similar cells are combined in one redox flow battery. The cells are then usually stacked one on top of the other, which is why the entirety of the cells is also referred to as a cell stack. The electrolyte usually flows through the individual cells in parallel to one another, whereas the cells are usually electrically connected in series. Therefore, the cells are usually hydraulically connected in parallel and electrically connected in series. In this case, the charge state of the electrolytes in one of the respective half-cells of the cell stack is the same.

To distribute the electrolytes to the corresponding half-cells of the cell stack and collectively discharge the electrolytes from the respective half-cells, the half-cells are connected to one another by means of ducts. Since a different electrolyte flows through each half-cell or cell interior space of a cell, the two electrolytes have be separated from one another as they are passing through the cell stack. Four bores, which in each cell frame element and/or in the cell stack form a duct perpendicular to the respective cell, the respective cell interior space and/or along the cell stack, are generally provided in the cell frames or cell frame elements for this purpose. In each case two of the ducts serve to transport one electrolyte. The electrolyte is supplied to the cell interior space via one duct, while the electrolyte is discharged from the cell interior space via the other duct. Therefore, to enable the supply and discharge of electrolytes to the half-cells and/or to make it possible for the electrolytes to flow through the cell interior spaces, distribution ducts connected to the cell interior space branch off from two ducts in each half-cell.

To ensure that the cells and, if necessary, the stacks are liquid-tight, the corresponding cell frames and, if necessary, also the corresponding electrodes and membranes are pressed onto one another, in which case contact between specific electrolytes and specific electrodes has to be avoided. Seals, for instance in the form of O-rings, flat seals, spray-on seals, or the like, are usually used to seal the ducts and/or the cell interior spaces. To be able to ensure the liquid-tightness of the cells or cell stacks, fairly high surface pressures have to be provided at the seals. For this reason, the cells or cell stacks are inserted into a clamping device between end-positioned clamping plates, which are pressed against the cell or cell stack by means of tension rods extending laterally along the cell stack.

Another option is to achieve the liquid-tightness by welding around the periphery of a number of cell frames. The weld seams permanently and inseparably seal the gap between the cell frames, the electrode(s), and/or the membrane(s). A plastic welding method is used and described as an example in DE 10 2013 107 516 A1.

Due to the clamping device and the many seals, the known redox flow cell stacks are very complex to produce, because a variety of work steps are necessary for the assembly. The welding method described above also involves many different time-intensive welding processes, and ties up cost-intensive production equipment (e.g. welding robots) for extended periods of time. All of this represents a large cost factor in the production of cell stacks. The time factor of stack production is significant as well and affects the production capacity.

The underlying object of the present invention is therefore to propose a cell and a cell stack, respectively of the type stated at the beginning and previously described in more detail, which make redox flow batteries with lower production costs possible. In addition, the time that production equipment is tied up for the production of such a stack should be drastically reduced in order to increase the production capacity.

This object is achieved in a cell according to the preamble of claim 1, in that at least the at least two cell frame elements with the membrane, the two electrodes, and/or at least one further cell frame element are overmoulded with a liquid plastic and permanently joined in a liquid-tight manner by the curing of the plastic. The components to be overmoulded are assembled, i.e. all the required cell frame elements, electrodes and/or membranes are stacked one on top of the other in the intended sequence and then placed inside a cast housing, which is open toward the top, and temporarily clamped by means of a device. The cell frame elements, electrodes, and membranes are formed in such a way that all the components advantageously project into the gap between the cast housing and the components to be overmoulded. The gap between the cast housing and the components to be enclosed is filled with a liquid plastic, so that the components to be overmoulded, i.e. the at least two cell frame elements with the membrane, the two electrodes, and/or at least one further cell frame element, are surrounded by the liquid plastic and joined. The liquid plastic is converted into a permanently solid state by curing with the aid of chemical curing agents, by heating and/or cooling, and thus permanently joins the overmoulded elements to one another, and to the cast housing. All the cell interior spaces and supply ducts are thus sealed off to the outside and to other cell interior spaces in a liquid-tight manner by the overmoulded cell frame elements. After the complete curing of the casting medium, the temporary clamping device can be removed again and returned to production for further use.

The aforementioned object is also achieved according to claim 7 with a cell stack comprising at least one such cell.

The invention has recognised that casting the at least two cell frame elements with the membrane, the two electrodes, and/or at least one further cell frame element makes a clamping device for pressing the cells or cell stacks and seals together unnecessary. The cell or cell stack is therefore permanently liquid-tight, and not dependent on the corrosion of the seals or the ageing of the clamping device. As a result, the clamping device does not require maintenance. Also, compared to cell frames which are welded together, reliability is increased and quality control with respect to leakage of liquid is simpler, because each weld seam has to be checked individually for liquid-tightness.

In principle, according to the invention, at least two cell frame elements can also be compression moulded together with one membrane, one electrode, and/or at least one further cell frame element, in order to achieve adequate tightness. If and how this is accomplished can be determined on a case-by-case basis. In any case, however, partial casting is carried out as described above, in particular between the components of the cell, where pressing together the components results in specific disadvantages. The membrane can preferably be a semi-permeable membrane, an ion-conducting membrane, and/or a porous membrane.

Aside from that, the electrodes are preferably bipolar plates. If a cell stack with cells connected in series is provided, the electrodes adjoin at least one cell interior space, preferably on both sides of cell interior spaces of different half-cells or cells, wherein the electrode closes off the at least one half-cell or at least the corresponding cell interior space to one side. On either side, the membrane respectively closes off one half-cell or one cell interior space of the cell. In the case of a cell stack, said cell stack preferably comprises at least two cells.

When the term casting is used in the context of the invention, it preferably refers to overmoulding all the cell elements with a liquid plastic in a mould that simultaneously forms the outer housing of the stack. The curing of the liquid plastic joins all the stack elements in a liquid-tight manner in one single work step.

The liquid plastics are preferably curable synthetic resins, which contain an epoxy group and are therefore also referred to as epoxy resins. These are inexpensive to use, because they can be processed in liquid form at room temperature and then cure chemically to a Duroplast. The chemical curing agent is already contained in the casting medium. Curing can take place at room temperature or accelerated by heating. In addition, these resins are chemically resistant in the cured state, have a high electrical resistance, galvanically isolate electric parts with different voltage levels, and can therefore be used in the redox flow battery application.

The casting medium consisting of a mixture of chemical curing agent and epoxy resin should have a low viscosity in the liquid state, so that it can flow into all the openings and compensate for surface irregularities of the cell frames in order to be able to seal all points. On the other hand, to prevent the casting medium from penetrating into the cell interior space from the outer casting region as a result of microscopic unevennesses of the cell frames and thereby affecting the function of the cell and/or the cell stack, the viscosity of the liquid casting medium cannot be too low. A viscosity of the casting medium of at least $5.0 \cdot 10^3$ mPa·s and at most $9.0 \cdot 10^3$ mPa·s has proven to be easy to use.

The castability can be increased further if the plastic of the cell frame elements is a non-polyolefin plastic. For reasons concerning the mechanical adhesion properties of the casting plastic, the thermoplastic is preferably polyvinyl chloride (PVC), polyamide (PA), polyphenylene sulphide (PPS), and/or polyetheretherketone (PEEK). Polyolefin thermoplastics with lower adhesive forces, such as polyethylene (PE) and/or polypropylene (PP), can furthermore be used as well.

In order to achieve a higher stability of the entire cell stack, the outer housing is likewise preferably made of a non-polyolefin plastic, such as polyvinyl chloride (PVC), polyamide (PA), polyphenylene sulphide (PPS) and/or polyetheretherketone (PEEK).

In order to be able to cast-in the electrode in a simple manner, it is advisable for the electrode to be made at least partially of at least one plastic, in particular at least one thermoplastic, preferably a non-polyolefin plastic such as polyvinyl chloride (PVC), polyamide (PA), polyphenylene sulphide (PPS) and/or polyetheretherketone (PEEK). The electrode preferably further consists of a composite of a plastic and conductive particles, preferably in the form of carbon, graphite, carbon black, titanium carbide (TiC), and/or at least one metal compound.

The cell frames are formed in such a way that the liquid-tightness from one half-cell interior space to another is ensured for a casting. For this purpose, two bores are provided in each cell frame element for the supply lines which extend perpendicular to the cell frame element and supply the half-cell interior space with electrolyte. The cell frames are furthermore formed to bridge the distance to the next cell frame, which encloses a similarly poled half-cell, with ducts, in order to allow the supply of the cell interior spaces with two different electrolytes. According to the invention, said ducts are designed as aligned bores and/or bulges and are offset to and/or located outside the main body of the cell stack, in order to allow the complete inclusion of all the juxtapositioned surfaces of the cell frame elements by the casting medium.

Every cell frame has openings and ducts, through which the corresponding electrolyte can flow from a supply line into the respective cell interior space and again be withdrawn from there and fed to a disposal line. In doing so, the electrolytes of the half-cells are transferred from a storage container into a collection container via the supply line and the disposal line. This allows the reuse of the electrolytes, which therefore do not have to be discarded or replaced.

In principle, an unlimited number of cells and thus cell frame elements can be cast-in. It is also possible to use a plurality of cell frame elements to construct one half-cell.

Assemblies of individual components, such as cell frames, membranes and/or electrodes, can alternatively also be cast in with other components and/or assemblies. These assemblies are predominantly produced prior to being put together in the casting mould. The individual components of the assemblies can also be joined in some other way, for example by compression moulding or welding. The assemblies are still subsequently overmoulded in a liquid-tight manner.

For the simple construction of a cell stack, it is expedient to construct all the cells of the cell stack similarly and symmetrically.

Figure 2:
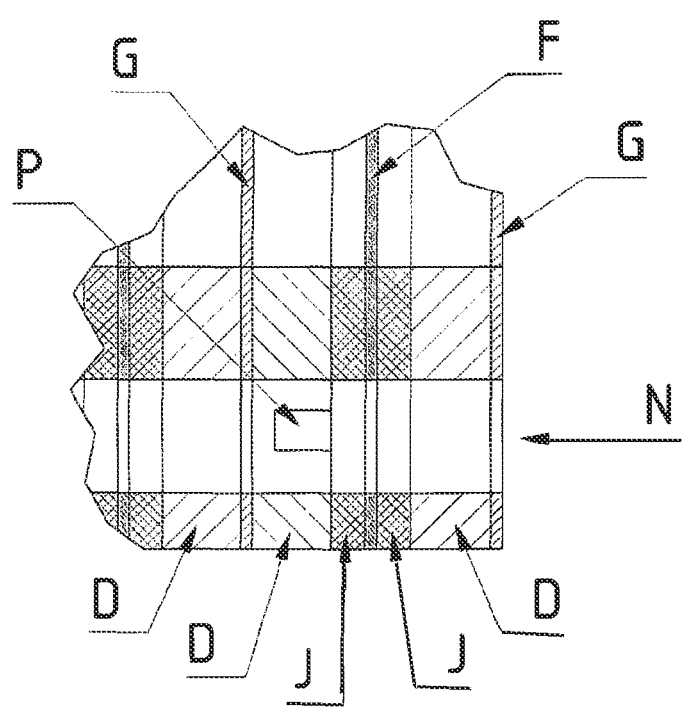
Figure 3:
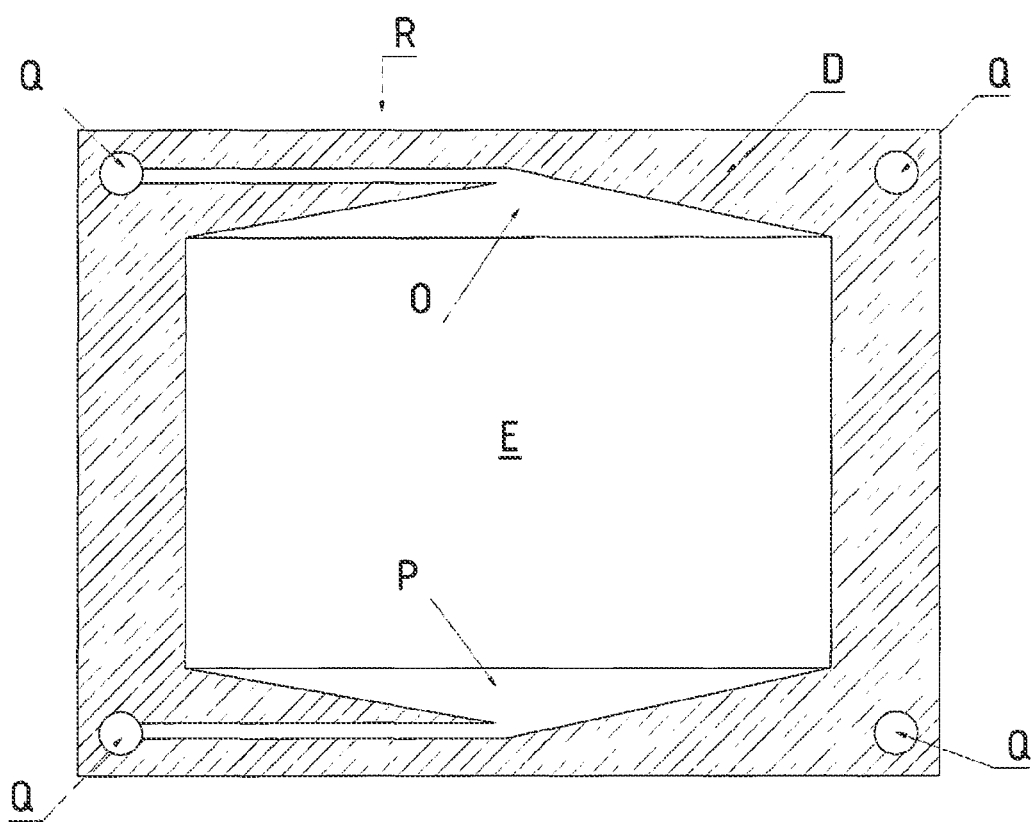
Figure 5:
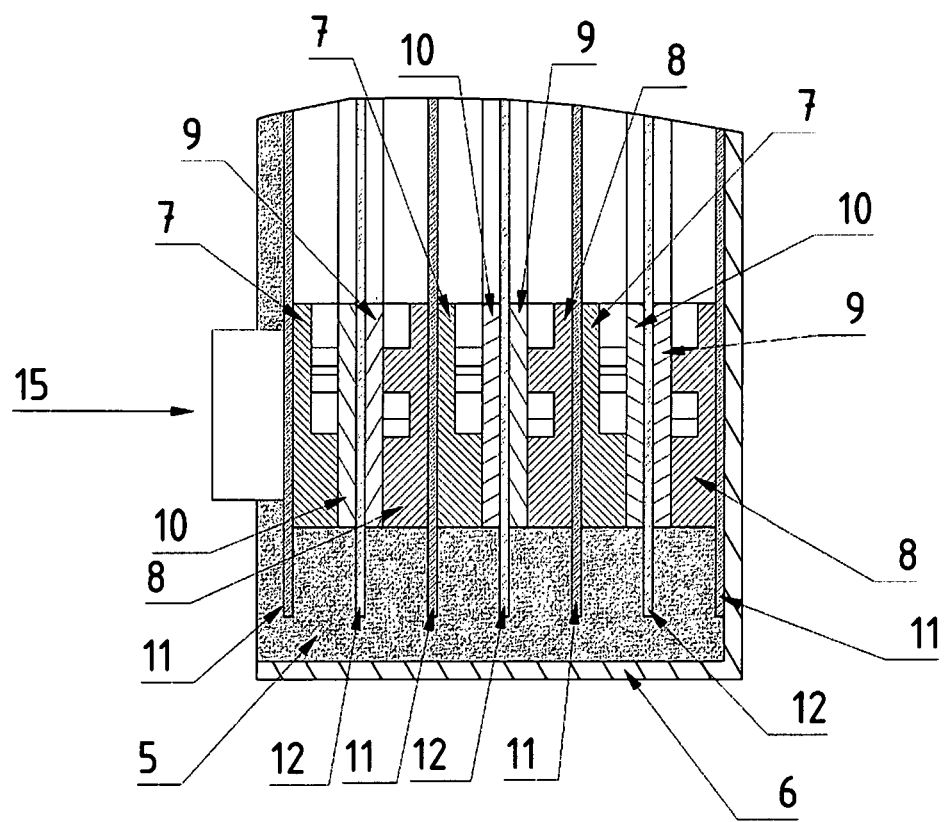
Figure 6:
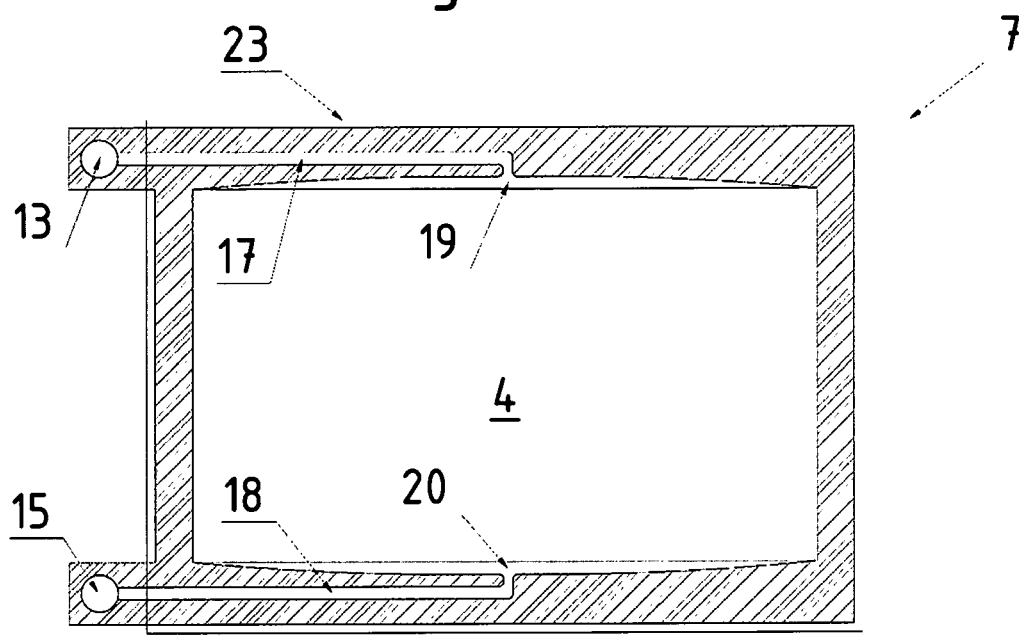
Figure 7:
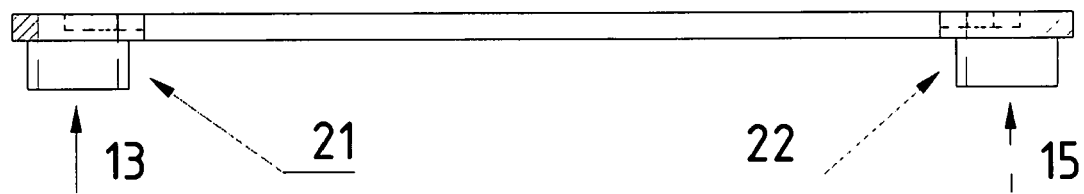
Figure 8:
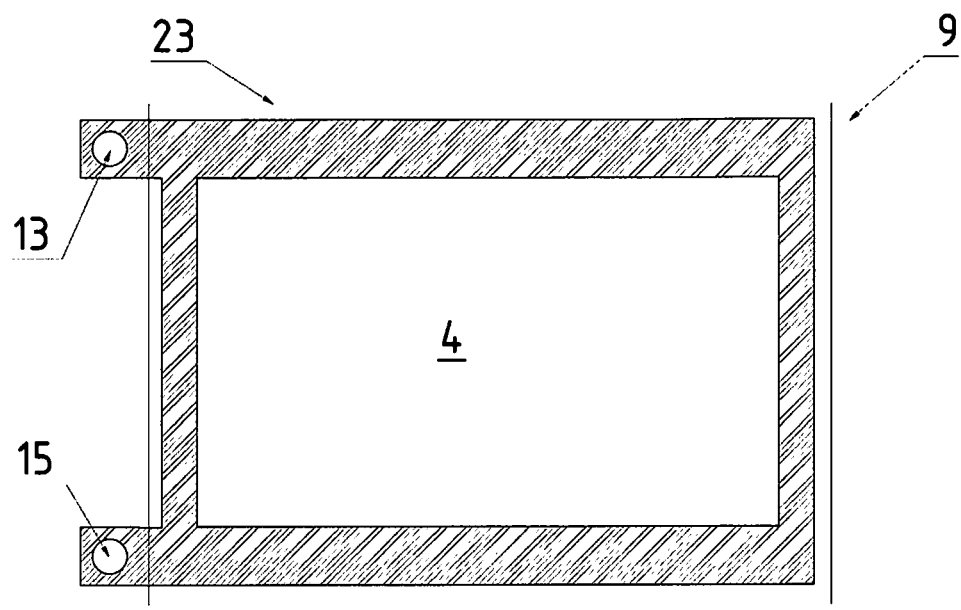
Figure 9:
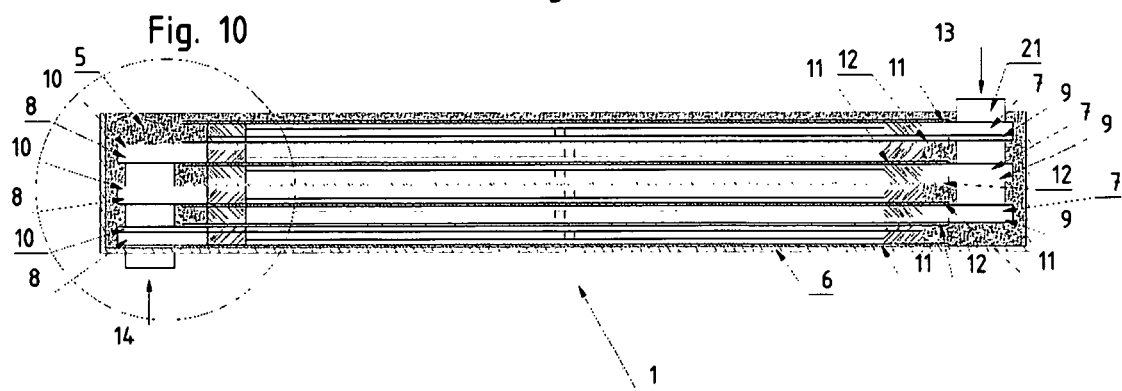

The invention is explained in more detail in the following using a drawing which illustrates designs that are merely examples. The drawing shows:

FIG. 1 a cell stack of a redox flow battery known from the prior art in a lateral sectional view, FIG. 2 a detailed representation of the cell stack of FIG. 1, FIG. 3 cell frame element of the cell stack of FIG. 1 in a plan view, FIG. 4 a first cell stack according to the invention in a lateral sectional view, FIG. 5 a detailed representation of the cell stack of FIG. 4, FIG. 6 a first cell frame element of the cell of FIG. 4 in a plan view, FIG. 7 the cell frame element of FIG. 6 in a side view, FIG. 8 a second cell frame element of the cell of FIG. 4 in a plan view, FIG. 9 the cell stack of FIG. 4 in a plan view, FIG. 10 a detailed representation of the cell stack of FIG. 9, FIG. 1 and FIG. 2 show a longitudinal section of cell stack A, i.e. a stack of cells, of a redox flow battery known from the prior art and described in more detail at the beginning. The cell stack A comprises three cells B, each of which has two half-cells C with corresponding electrolytes. Each half-cell C comprises a cell frame element D comprising a cell interior space E, through which an electrolyte stored in a storage container can be passed. Adjacent to the cell frame element D of the second half-cell C, the cell interior space E is closed off by a semi-permeable membrane F provided between the cell frame elements D of the two half-cells C. On the other end face of the cell frame elements D, the half-cells are closed off by electrodes G. The electrodes G also close off the cell interior spaces E adjacent to the next cell B.

In the depicted cell stack A, the electrode G lies flat on an outer side H of the cell frame D. The electrode G and the end faces of the cell frame elements D rest against the electrode G on opposite sides. A sealing material J is located between the other end faces of the cell frame elements D of a cell B, in which the membrane F is accommodated in a sealing manner.

In the depicted redox flow battery, four ducts for supplying and discharging electrolyte extend longitudinally to the cell stack A. In one respective half-cell C of each cell B, distribution ducts O branch off from two ducts via which the electrolyte can be supplied to the corresponding cell interior space E of the half-cell C. On opposite sections of the corresponding cell frames D, distribution ducts P are provided, via which the electrolyte can be discharged.

FIG. 3 shows a plan view onto a cell frame element D of the cell stack of FIG. 1. Four bores Q are provided in the corners of the cell frame D, of which each bore forms a part of a duct for the electrolytes. The branched distribution ducts O, P are recessed as depressions in the frame R of the cell frame element D arranged around the cell interior space E.

FIG. 4 shows a cell stack 1 according to the invention in a sectional view. The cell stack 1 comprises three cells 2, each having two half-cells 3. The respective two half-cell interior spaces 4 per cell are enclosed by four cell frame elements 7, 8, 9, 10. The half-cell interior spaces 4 are separated from the next half-cell interior space of the same cell by a membrane 12. The half-cell interior spaces 4 are separated from the next half-cell interior space of another cell by an electrode 11. In order to supply the respective half-cells with electrolyte solutions, bores 13, 14, 15, 16 are provided in the cell frame elements 7, 8, 9, 10 perpendicular to the half-cell interior spaces. The cell frame elements 7 and 8 as well as 9 and 10 are identical. The cell frame elements are always arranged in such a way that the two half-cell interior spaces in every cell 2 are supplied with different electrolytes in each case. To do this, the inflow duct 13 and the outflow duct 15 are used to supply the positive half-cell, and the inflow duct 14 and the outflow duct 16 are used to supply the negative half-cell. All cell frame elements 7, 8, 9, 10 as well as all required electrodes 11 and membranes 12 are placed into the cast housing 6. The space 5 between the cast housing 6 and all the stack components is peripheral and is filled with the casting medium. The casting medium thus seals off potential gaps between the cell frame elements 7, 8, 9, 10, the electrodes 11 and/or the membrane 12 toward the outside in a liquid-tight manner. This also cuts off possible connections between a positive and a negative half-cell interior space in a liquid-tight manner.

FIG. 5 shows a detailed view of the space 5 of the cell stack shown in an overall section in FIG. 4.

FIG. 6 shows a plan view of a first cell frame element 7, 8. The ducts 13, 14, 15, 16, which extend perpendicular to the half-cell interior space 4, have connecting ducts 17, 18 to the openings 19, 20 on two narrow sides of the cell interior space to supply said cell interior space with a liquid electrolyte solution. To guide the flow laterally past the cell frame elements of the oppositely poled half-cells, the supply ducts 13, 14, 15, 16 are offset from the main volume body 23 of the cell stack. This allows the casting medium to completely enclose the supply duct formed by bulges 21, 22 of the cell frame elements themselves, and thus seal possible gaps at the connection points. FIG. 7 shows a cell frame element in a side view, in which the bulges 21, 22 are clearly depicted.

FIG. 8 shows a second cell frame element 9, 10. Here too, there are bores for the supply ducts 13, 14, 15, 16, which are designed to be aligned with the bores in the cell frame elements 7, 9. These cell frame elements 8, 10 have the task of covering the connecting ducts 17, 18 and their openings 19, 20 perpendicular to the half-cell interior space 4, and thus to close them in a liquid-tight manner.

In an alternative, not depicted, embodiment of the cell frame element, the cell frame elements can also be configured such that the function of the cell frame elements of the type 7, 8 and the type 9, 10 are realised by one single cell frame element. Only one cell frame element per half-cell would thus be necessary.

FIG. 9 and FIG. 10 show the already described cell stack of FIG. 4 in a plan view. The peripheral gap 5 between the cast housing 6 and all the stack components can again clearly be seen here.

The invention claimed is:

1. A cell (2) of a redox flow battery, having at least two cell frame elements (7, 8, 9, 10), a membrane (12), and two electrodes (11), wherein the at least one cell frame element (7, 8, 9, 10), the membrane (12), and the two electrodes (11) enclose two half-cell interior spaces (4) which are separated from one another, wherein, in the at least two cell frame elements (7, 8, 9, 10), at least four separate supply ducts (13, 14, 15, 16) are provided in such a way that different electrolyte solutions can flow through the two cell interior spaces (10), and wherein, aside from the at least four separate supply ducts (13, 14, 15, 16), the cell (2) is liquid tight, characterised in that the at least two cell frame elements (7, 8, 9, 10), the two electrodes (11), and the membrane (12) are placed in a cast housing (6) and a gap between the at least two cell frame elements (7, 8, 9, 10), the two electrodes (11) and the membrane (12) is filled with a liquid casting medium, as a result of which all the mentioned components are cast together in a liquid-tight manner and each cell frame element (7, 8, 9, 10) has exactly two bores, recesses and/or bulges for the separate supply ducts (13, 15 or 14, 16) and said supply ducts are offset from a main volume body of the cell (23) and located outside the main volume body of the cell (23).

2. The cell according to claim 1, characterised in that the casting medium is a liquid and electrically insulating plastic which can be cured by means of a chemical process and/or under the action of heat.

3. The cell according to claim 2, characterised in that the at least two cell frame elements (7, 8, 9, 10), the electrodes (11) and/or the membrane (12) are permanently joined to the cast housing (6).

4. The cell according to claim 1, characterised in that the at least two cell frame elements (7, 8, 9, 10), the electrodes (11), the membrane (12) and/or the cast housing are made of plastic and/or a plastic-containing material.

5. The cell according to claim 4, characterised in that the at least two cell frame elements (7, 8, 9, 10), the electrodes (11) and/or the membrane (12) are permanently joined to the cast housing (6).

6. The cell according to claim 4, characterised in that the plastic is a thermoplastic.

7. The cell according to claim 6, characterised in that the at least two cell frame elements (7, 8, 9, 10), the electrodes (11) and/or the membrane (12) are permanently joined to the cast housing (6).

8. The cell according to claim 1, characterised in that the at least two cell frame elements (7, 8, 9, 10), the electrodes (11) and/or the membrane (12) are permanently joined to the cast housing (6).

9. The cell according to claim 1, characterised in that the at least two cell frame elements (7, 8, 9, 10), the electrodes (11) and/or the membrane (12) are permanently joined to the cast housing (6).

10. A cell stack (1) of a redox flow battery, characterised in that at least one cell (2) according to claim 1 is provided.

11. The cell stack according to claim 10, characterised in that at least one cell frame element (7, 8, 9, 10) has bulges (21, 22) which are aligned with the bores and bulges of the next cell frame element, which encloses an identically poled cell interior space, in order to provide the supply ducts (13, 14, 15, 16) when the cells are stacked to form a cell stack.

* * * * *